Nov. 9, 1926.
W. H. HERMANN
FABRIC ASSEMBLY TABLE
Filed Jan. 5, 1924
1,606,123
4 Sheets-Sheet 3
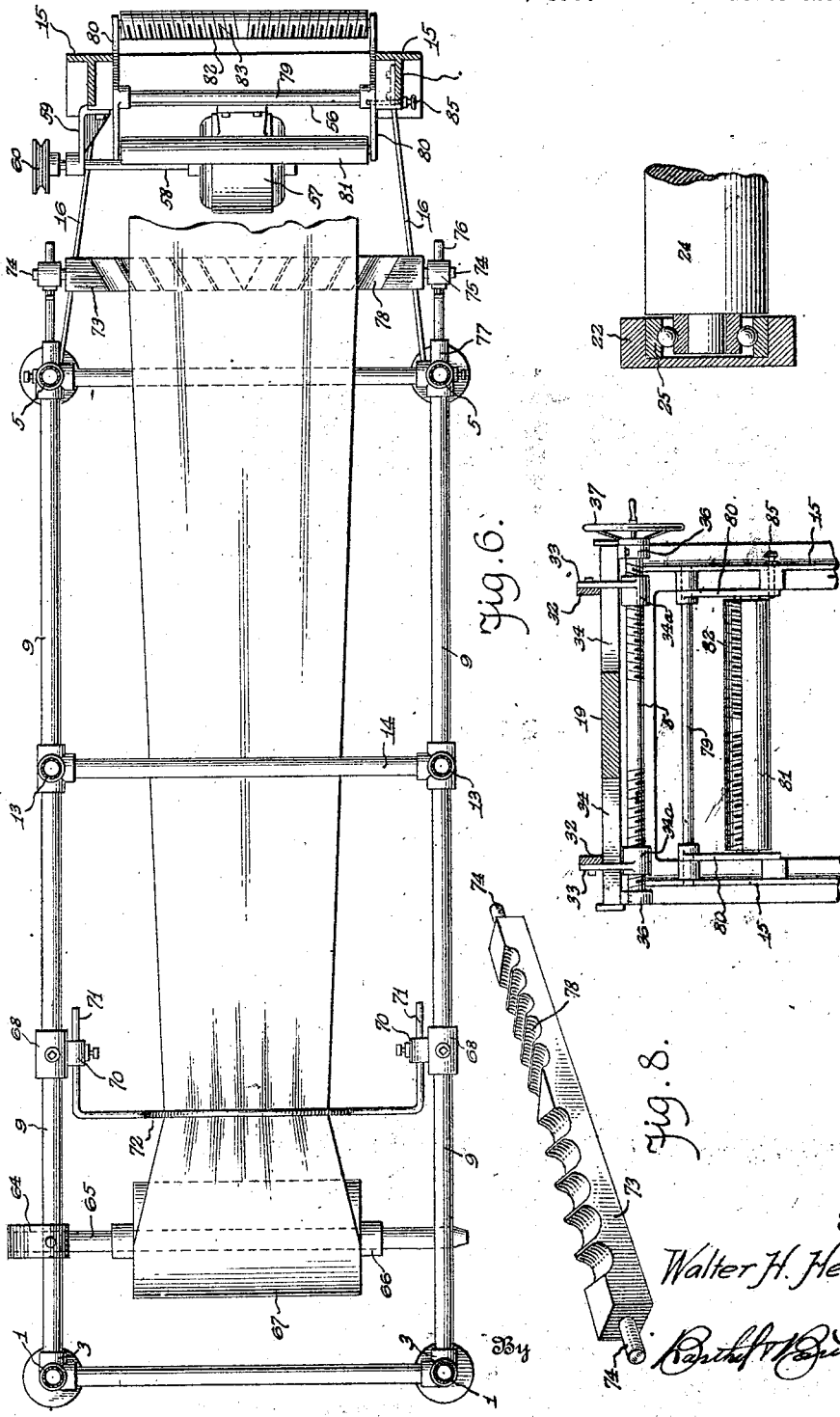
Inventor
Walter H. Hermann,
By
Attorneys Nov. 9, 1926.

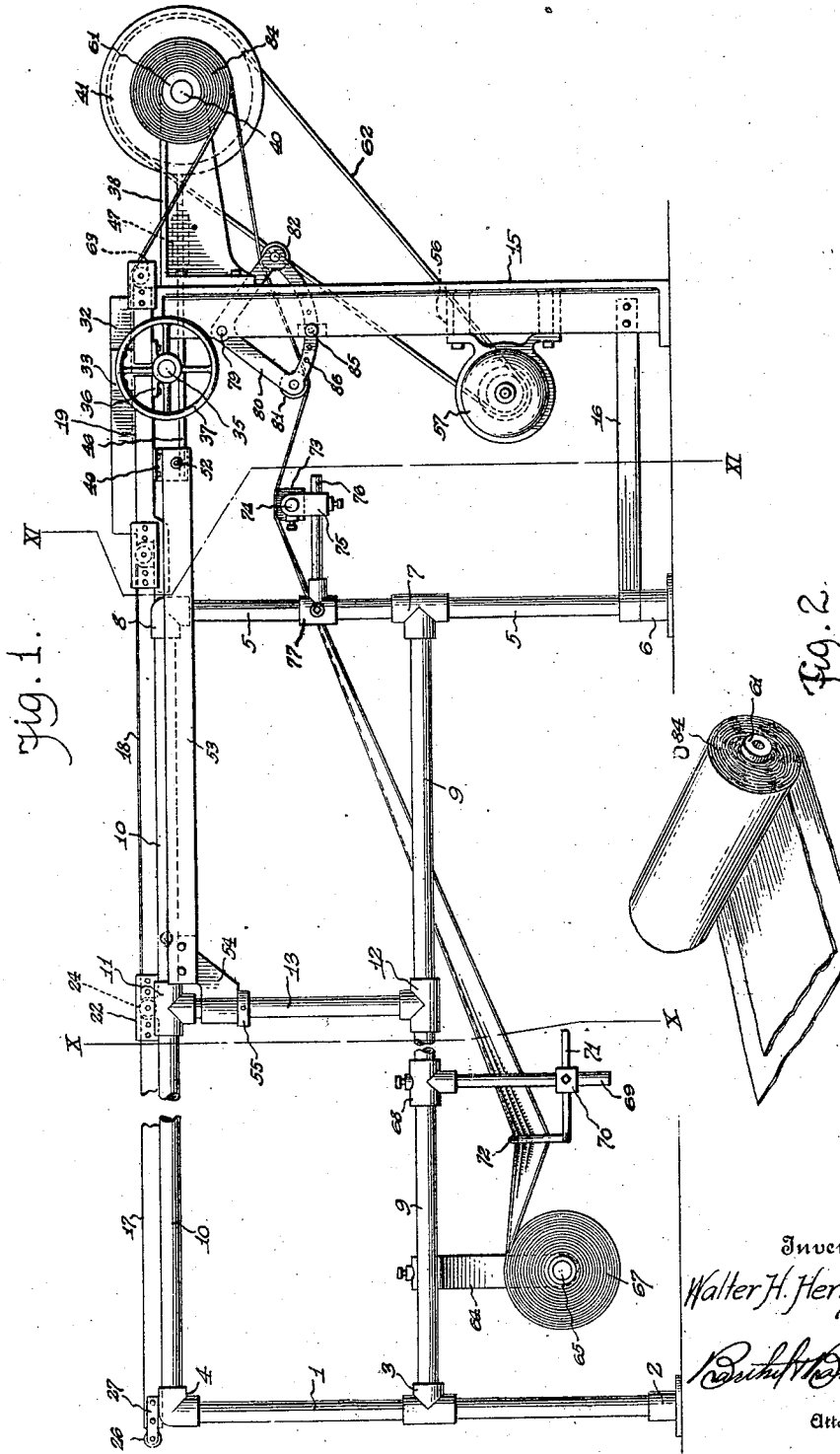

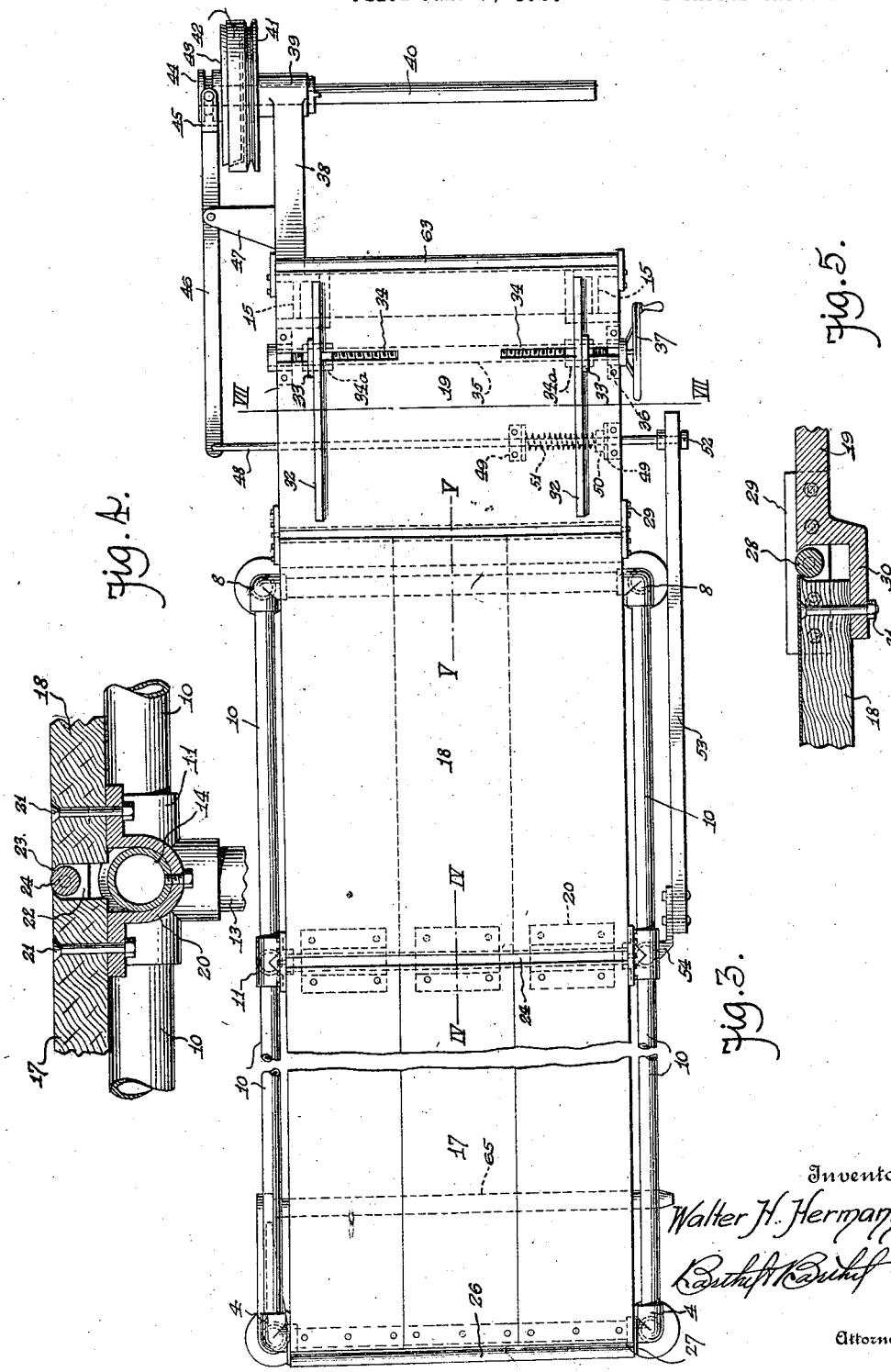

W. H. HERMANN 1,606,123

FABRIC ASSEMBLY TABLE

Filed Jan. 5, 1924    4 Sheets-Sheet 4

Inventor
Walter H Hermann,

By

Attorneys

Patented Nov. 9, 1926.

1,606,123

UNITED STATES PATENT OFFICE.

WALTER H. HERMANN, OF LANCASTER, OHIO.

FABRIC-ASSEMBLY TABLE.

Application filed January 5, 1924. Serial No. 684,678.

In the manufacture of rubber tires building machines are employed for maintaining rolls of stock adjacent a core on which a tire body, carcass or complete tire outer casing may be fabricated, and the rolls of stock are ordinarily composed of one or more strips of rubber, rubberized fabric or other gummed or adhesive material, with a non-adhesive strip or strips of material sandwiched therebetween, so that the convolutions of adhesive material will not adhere together and be readily separable when withdrawn from a tire building machine with the adhesive material going to the core and the non-adhesive material being received on an idle roll or stock shell. Such is a fair sample of the practice in tire factories and it is obvious that in order to supply tire building machines the rolls of stock must first be prepared for use in the machines. The adhesive material ordinarily comes in strips adapted to be placed end to end and the non-adhesive material is ordinarily in roll formation. These two materials are brought together and rolled so that the rolled material will be in condition for mounting in a building machine.

My invention aims to provide an assembly table by which strips of adhesive and non-adhesive or liner material may be expeditiously and economically placed in rolled formation with the non-adhesive material sandwiched between the convolutions of the adhesive material. The adhesive material may be shifted over the top of the table, and if in separate pieces the ends of the adhesive strips may be joined to form a single strip adapted to be wound on a stock shell. Provision is made for centering and guiding the adhesive material over the table.

Below the table are means for guiding a strip of non-adhesive material from a roll to another roll which receives adhesive material with the non-adhesive material between the convolutions of the adhesive material. Provision is made for stretching the non-adhesive strip of material, for maintaining the requisite tension on the strip of non-adhesive material, and for revolving the make-up stock roll.

My invention further aims to provide an assembly table wherein the parts are constructed with a view of reducing the cost of manufacture and at the same time retain those features by which durability, accessibility and ease of control are secured. With such ends in view my invention resides in the construction to be hereinafter described and then claimed, and reference will now be had to the drawings, wherein Figure 1 is a side elevation of the table, partly broken away;

Fig. 2 is a perspective view of a make-up stock roll including adhesive and non-adhesive material;

Fig. 3 is a plan of the table partly broken away;

Fig. 4 is an enlarged longitudinal sectional view taken on the line IV—IV of Fig. 3;

Fig. 5 is a similar view taken on the line V—V of Fig. 3;

Fig. 6 is a horizontal sectional view of the table;

Fig. 7 is a cross sectional view taken on the line VII—VII of Fig. 3;

Fig. 8 is a perspective view of a detached spreader bar;

Fig. 9 is a detail view of one end of a roller bearing;

Figures 10, 11:
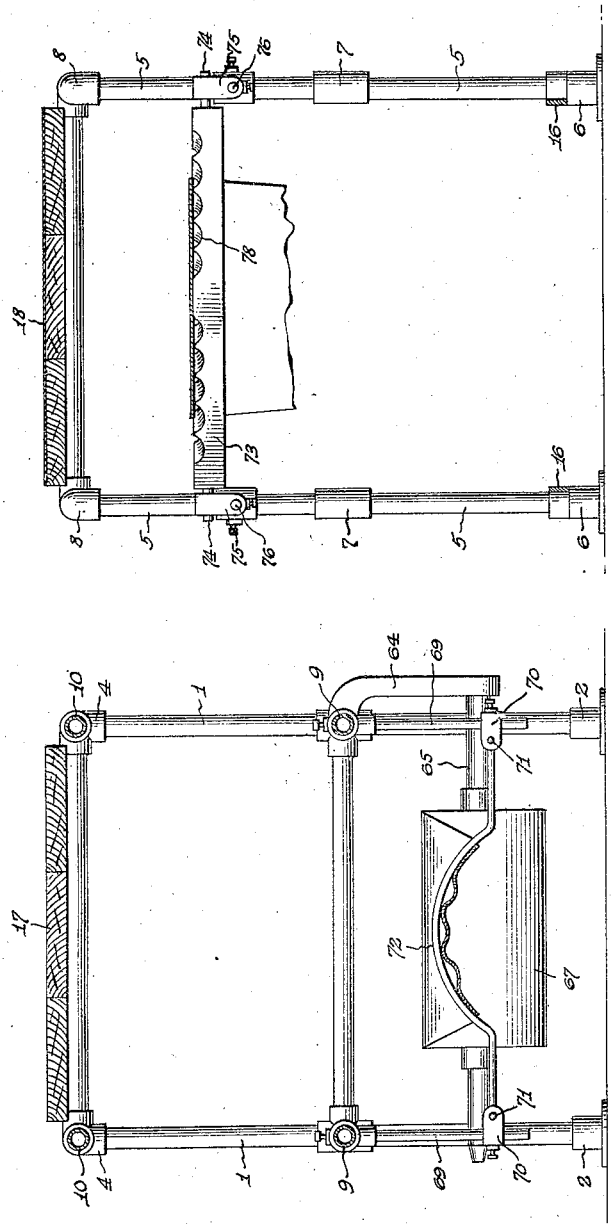
Fig. 10 is a cross sectional view taken on the line X—X of Fig. 1.
Fig. 11 is a similar view taken on the line XI—XI of Fig. 1.

As far as possible I construct my table or apparatus of standard material and utilize pipes and fittings in the main framework of the table. For instance there are rear legs 1 provided with feet 2, three-way T's 3, and three-way elbows 4 which are plumbing fittings.

Spaced from the rear legs 1 are intermediate legs 5 provided with feet 6 and T's 7 and elbows 8 similar to the T's 3 and elbows 4.

Connecting the T's 3 to the T's 7 are longitudinal side rails 9 and connecting the elbows 4 to the elbows 8 are longitudinal side rails 10. Intermediate the ends of these rails are three-way T's 11 and 12 with the T's 11 connected to the T's 12 by upright rails 13. Two side frames are thus formed and spacing said frames apart and maintaining the same upright are a plurality of transverse upper and lower members 14.

Adjacent the intermediate legs 5 are front legs 15 preferably in the form of upright angle bars which are connected to the lower ends of the legs 5 by bottom rails 16. The upper ends of the front legs 15 are adapted to cooperate with the upper transverse members 14 in supporting a sectional table top, composed of a front section 17, an intermediate section 18 and a front section 19. The table top sections 17 and 18 may be made of planks, and the section 18 may be covered with a sheet of zinc or other metallic material, while the section 19 may be all of metal, or like the section 18 of material to which strips of adhesive material will not readily adhere. The adjoining ends of the table top sections 17 and 18 are connected by a series of U-shaped straps 20 extending under one of the upper transverse members 14 and bolted or otherwise secured, as at 21, to the lower faces of the sections 17 and 18. In addition to the straps 20 there are side plates 22 suitably attached to the side edges of the sections 17 and 18 and said sections are spaced apart and formed with ribs or ledges 23 overhanging the roller 24 journaled in anti-frictional bearings 25 mounted in the side plates 22. Such details are best shown in Figs. 3, 4 and 9.

At the rear end of the table top section 17 is a roller 26 supported in side plates or brackets 27 carried by the side edges of the section 17, and between the confronting ends of the table top sections 18 and 19 is another roller 28 which is supported by side plates 29 attached to the side edges of the sections 18 and 19. Instead of using the straps 20 for connecting the sections 18 and 19, the section 19 has an underlying flange or ledge 30 bolted or otherwise connected as at 31, to the lower face of the table top section 18, as best shown in Fig. 5. The rollers 24, 26 and 28 will facilitate shifting the strip or strips of adhesive material over the table top.

On the metallic table top section 19 are placed parallel adjustable guides 32, which are slidable transversely of the section 19 to and from each other, said guides being attached to uprights 33 extending through transversely alining slots 34 of the table top section 19. The uprights 33 are carried by nuts or travelers 34ª in screwthreaded engagement with a rotatable shaft 35, journaled in bearings 36 carried by the lower face of the table top section 19. On one end of the shaft 35 is a hand wheel 37 by which the shaft may be rotated in either direction to shift the longitudinally disposed parallel guides 32 to and from each other so as to properly center a strip or strips of adhesive material relative to a make-up roll. The construction and arrangement of the adjustable guides are best shown in Figs. 4 and 7.

Projecting forwardly from the upper end of one of the front legs 15 is a bracket 38 having a bearing 39 for a rotatable make-up roll spindle 40 on which may be detachably mounted, to rotate therewith, a roll core or stock shell 61 which may be slipped on and off of the spindle from the front side of the table. The rear end of the spindle 40 is provided with a loosely mounted power transmission wheel 41 having a portion 42 serving as a clutch member and adapted to engage said clutch member is another clutch member 43 slidably keyed on the rear end of the spindle 40. Forming part of the clutch member 43 is a spool or circumferentially grooved hub 44 and engaging said spool is the forked end 45 of a lever 46 pivotally mounted on a side extension 47 of the bracket 38. The opposite end of the lever 46 is pivotally connected to a transversely disposed rod 48 extending through depending guides 49 carried by the lower face of the table top section 19, and on the rod 48, between said guides is a fixed abutment 50 for a coiled spring 51 encircling the rod 48 and bearing against one of the guides 49, so that the expansive force of said spring may hold the abutment 50 normally disengaged.

The forward end of the rod 48 is loosely connected, as at 52 to a pressure bar 53 extending longitudinally of the front side of the table and attached to a swiveled bracket 54 supported by a collar 55 on the front upright rail 13. An operator at the front side of the table need only lean against or press the bar 53 to shift the rod 48 and the lever 46 to place the clutches in engagement with each other and establish a driving relation for the spindle 40.

Connecting the front legs 15 is a transverse member 56 and attached thereto is an electric motor 57 which has an elongated armature shaft 58, journaled in a bearing 59 carried by the foremost leg 15. On the armature shaft 58 is a power transmission wheel 60 in a vertical plane with the power transmission wheel 41 so that an endless power transmission member 62 may be trained about the power transmission wheels to permit of the motor 57 driving the spindle 40 when the clutch members are engaged. These clutch members may be of the friction type of any conventional form of clutch.

The stock shell 61 will be supported in a plane slightly below the horizontal plane of the table top and on the front end of the table top section 19 I provide a roller 63 somewhat similar to the roller 26 so that strips of adhesive material may easily pass off of the table on to the stock shell 61 or a stock roll being built up on the shell. Thus far I have described the manner of handling a strip or strips of adhesive material for winding into a stock roll and it is on the table top that strips of adhesive material may have the ends thereof overlapped or suitably joined to form a continuous strip which will be guided on to the stock roll by the guides 32 on the table top section 19.

Reference will now be had to the devices carried by the apparatus for guiding and centering non-adhesive material for winding into the stock roll between the convolutions of the adhesive material.

Mounted on the rear longitudinal rail 9, adjacent the rear end of the table, is an adjustable hanger 64 provided with a spindle 65 extending to the front side of the machine. This spindle is adapted to loosely hold the shell 66 of a roll 67 of non-adhesive material which is in strip form so that it may be conveniently unwound towards the front end of the table for winding on the stock roll.

On the rails 9 are adjustable T's 58 provided with depending rods 69 and adjustable on said rods are heads 70 for the arms 71 of an arcuated centering device 72, said device being arched so that the strip of non-adhesive material may pass under said device and in so doing be somewhat gathered and centered relative to the table. From this device the strip of non-adhesive material extends upwardly between the intermediate legs 5 and over a spreader bar 73 having pintles 74 adjustably held in heads 75 adjustable on forwardly extending rods 76, carried by adjustable T's 77 mounted on the intermediate legs 5. The spreader bar 73 is best shown in Fig. 8, as having a series of grooves 78 in the end portion thereof with the series of grooves converging towards the rear end of the table and the longitudinal edges of the spreader bar rounded off so that the ridges between the grooves may have a spreading action for the strip of non-adhesive material as it is drawn over the spreader bar. In other words the material will be widened out and somewhat of a lateral tension placed on the material towards the side edges thereof to avoid any wrinkles or folded portions.

Journaled in the front legs 15, contiguous to the upper ends thereof, is a rock shaft 79 and mounted on said rock shaft are sector shaped frames 80 connected by tension rollers 81 and 82, the former being practically smooth and the latter provided with spiral threads 83 on the end portions of the roller with the threads at one end of the roller the reverse of the threads at the opposite end, whereby said threads will tend to spread the strip of non-adhesive material laterally and outwardly from a center line thereof. The rollers 81 and 82 are adapted to produce somewhat of a tension on the strip of non-adhesive material as it passes from the spreader bar 73 under the roller 81 and over the roller 82 on to the make-up or stock roll which is designated 84. The tension rollers 81 and 82 may be adjusted relative to the strip of non-adhesive material at the front side of the apparatus by a pin 85, carried by the front leg 15, extending into one of the series of openings or sockets 86 in the rear frame 80.

In using the table it is preferable to start the non-adhesive material on the core 51 so that the adhesive material will not adhere to the core and it is in this connection that the non-adhesive material may be strips of muslin while the adhesive material may be skim coated or rubber saturated canvas or the like fabric. After these two materials are wound to make up the roll 84, the roll can be removed with the core therein and since the non-adhesive material is of greater width than the adhesive material, as shown in Fig. 2, the non-adhesive material will have its end edges fully protected. As in all tire machines provision is made for separating the materials so that the adhesive material may be applied to a core and the non-adhesive material taken upon an idle shell and returned without rerolling to the spindle 65 of my table.

While in the drawings there are illustrated the preferred embodiments of my invention, it is to be understood that the structural elements are susceptible to such variations and modifications as fall within the scope of the appended claims.

What I claim is:—

1. An assembly table over which adhesive stock may be shifted and cut on said table, guiding means on said table for contact with the side edges of the adhesive stock, guiding means under said table for non-adhesive stock, adjustable tensioning means carried by said table for the non-adhesive stock, roll building means adapted to receive the non-adhesive material from under said table for winding the adhesive and non-adhesive material together, and means under said table for separating the non-adhesive material before said material is placed under tension.

2. An assembly table over which adhesive stock may be shifted from a receiving end of said table to a discharge end thereof, longitudinal parallel adjustable guides on said table at the discharge end thereof for contact with the side edges of the adhesive stock, guiding means under said table at the receiving end thereof for non-adhesive stock, adjustable tensioning means carried by said table at the discharge end thereof for the non-adhesive stock, and roll building means at the discharge end of said table adapted to receive the non-adhesive material from under said table for winding the adhesive and non-adhesive material together.

In testimony whereof I affix my signature.

WALTER H. HERMANN.